UNITED STATES PATENT OFFICE

FRITZ OVERDICK, OF HULS, GERMANY, ASSIGNOR TO I. G. FARBENINDUSTRIE AKTIEN-GESELLSCHAFT, OF FRANKFORT-ON-THE-MAIN, GERMANY, A CORPORATION OF GERMANY

PROCESS FOR PURIFYING COAL GASES

No Drawing. Application filed December 19, 1928, Serial No. 327,194, and in Germany December 21, 1927.

The present invention concerns a process for the simultaneous removal of ammonia, hydrogen sulfide and hydrogen cyanide from gases with the recovery of ammonium sulfate, sulfur and ammonium thiocyanate by means of wash liquors containing ammonium polythionate and ammonium thiosulfate and consists in adding to the wash liquors, besides the quantity of ammonia necessary for complete absorption of the hydrogen sulfide, the requisite amount of ammonia needed for fixing the hydrogen cyanide and, after boiling, separating from the resulting wash liquor the ammonium sulfate and ammonium thiocyanate by fractional evaporation.

In removing ammonia and hydrogen sulfide from gases by means of ammonium polythionate solutions, it has hitherto been necessary first to remove the hydrogen cyanide from the gas, since this, according to the prevailing conditions, was also more or less absorbed with the formation of ammonium thiocyanate, thereby contaminating the ammonium sulfate obtained.

In accordance with the present invention, ammonia, hydrogen sulfide and hydrogen cyanide are simultaneously and completely removed from the gases by means of polythionate solutions without a preliminary hydrogen cyanide washing, whilst the products obtained are separated from one another in the most simple manner.

The first part of the process, the absorption of hydrogen cyanide besides hydrogen sulfide by polythionate solutions, only proceeds quantitatively, when the liquor is maintained weakly alkaline, that is to say, when the wash liquor contains, in addition to the quantity of ammonia necessary for a complete absorption of the hydrogen sulfide, such additional ammonia as is needed for the formation of the ammonium thiocyanate produced in the hydrogen cyanide absorption:—

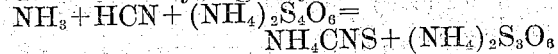
$$NH_3 + HCN + (NH_4)_2S_4O_6 = NH_4CNS + (NH_4)_2S_3O_6$$

As has also been established (U. S. Patent 1,826,779), a quantitative absorption of hydrogen sulfide is only achieved, when more than two molecules of ammonia are added to the polythionate solution for each molecule of hydrogen sulfide to be absorbed. The requisite ratio of ammonia to hydrogen sulfide depends on the conditions of working and is in general about 2,3 molecules of ammonia to one molecule of hydrogen sulfide. Thus for the hydrogen cyanide absorption one molecule of ammonia must be added to each molecule of hydrogen cyanide over and above this proportion. Since, however, in most cases the ammonia content of the gas does not suffice for this purpose, the quantity of ammonia lacking must be made up from other sources in order to carry out the process. The same applies in every case to the sulfur, the quantity of which must be replenished at the rate at which the quantity of ammonia exceeds the ratio of two molecules of ammonia to one molecule of hydrogen sulfide.

The following examples serve to illustrate our invention without limiting it thereto. The percentages stated therein are percentages by volume.

*Example 1.*—The crude gas contains on an average 1,2 per cent of ammonia, 0,8 per cent of hydrogen sulfide and 0,1 per cent of hydrogen cyanide. The complete absorption of the hydrogen sulfide is presumed to require for each molecule of hydrogen sulfide about 2,3 molecules of ammonia, that is to say in this case, 1,84 per cent of ammonia. To this has to be added 0,1 per cent needed for fixing the hydrogen cyanide, so that for carrying out the process 1,94 per cent of ammonia is required. Thus there is lacking (1.94−1.2) =0.74 per cent of ammonia and $$\left(\frac{1.84}{2} - 0.7\right) = 0.22$$

per cent of sulfurous acid or sulfur, that is to say 7.4 cbm. of ammonia and 2.2 cbm. of sulfurous acid must be added for each 1000 cbm. of gas.

The process in question can be carried out in a more economical manner with the quantities of ammonia and sulfur occurring in the gas by utilizing the combination described in the application Ser. No. 286,712, in which case the absorption of hydrogen cyanide is carried out in the second stage of the process by then adding a quantity of ammonia equivalent to the hydrogen cyanide or alternatively precipitating in the first stage a corresponding amount of hydrogen sulfide.

*Example 2.*—The proportions of gas are as in Example 1 that is to say 1.2 per cent of ammonia are available for the second stage with which 0.52 per cent of hydrogen sulfide can be washed out, so that 0.28 per cent of hydrogen sulfide must be removed in the first stage. Since however in the second stage 0.1 per cent of ammonia is consumed in the hydrogen cyanide absorption only 0.48 per cent of hydrogen sulfide can be absorbed by the remaining 1.1 per cent of ammonia. Therefore 0.32 per cent of hydrogen sulfide must be removed in the preliminary stage.

As has already been said it was indeed known that polythionate reacts with hydrogen cyanide, nevertheless the utilization of this fact for technical working has never been contemplated, since it is the present invention which first develops the complete absorption of cyanogen under the conditions herein described and moreover no means were available of working up the wash liquors obtained.

The separation of the ammonium thiocyanate from the other salts of the wash liquor constitutes the second part of the process. For this purpose the liquor containing chiefly ammonium polythionate, thiosulfate and ammonium thiocyanate is boiled in the known manner so that, after filtration from the separated sulfur, it only contains ammonium sulfate and ammonium thiocyanate. These two salts can be easily and completely separated technically by fractional evaporation. The solubility of ammonium sulfate is reduced by the presence of ammonium thiocyanate to such an extraordinary extent, that on evaporation of the liquor ammonium sulfate is almost completely precipitated before the separation of ammonium thiocyanate begins. Conversely there is obtained finally a saturated ammonium thiocyanate solution only slightly contaminated with ammonium sulfate. Since ammonium thiocyanate is extremely easily soluble, the impurities, even when calculated on the dry salt, are only insignificant, all the more so, the higher the evaporation temperature has been, since the ammonium thiocyanate content of a solution saturated with both salts rises very rapidly with the temperature while under the same conditions the sulfate content even falls still a little further.

The combination of this method of working with the absorption described above constitutes an entirely new process for simultaneously purifying gases, from ammonia, hydrogen sulfide and hydrogen cyanide, the products of the purification being obtained in the form of ammonium sulfate, sulfur and ammonium thiocyanate. A great advantage of the process is to be found in the fact that a separate hydrogen cyanide washing and therewith separate apparatus is avoided and that moreover the large absorption capacity of the liquor for hydrogen cyanide renders possible a complete purification. The evaporation of the boiled wash liquor is likewise carried out without further expense, since fractionating only takes place towards the end of the evaporation.

The process can be carried out under superatmospheric pressure.

I claim:—

1. Process which comprises washing crude coal gases with wash liquors containing ammonium polythionate and ammonium thiosulfate and such a quantity of free ammonia as is necessary for the complete removal of hydrogen sulfide and hydrogen cyanide, boiling the resulting liquors, separating the sulfur obtained and fractionally evaporating the ammonium sulfate and ammonium thiocyanate containing liquor.

2. Process which comprises washing crude coal gases with wash liquors containing ammonium polythionate and ammonium thiosulfate and such a quantity of free ammonia as is necessary for the complete removal of hydrogen sulfide and hydrogen cyanide, boiling the resulting liquors, separating the sulfur obtained and fractionally evaporating the ammonium sulfate and ammonium thiocyanate containing liquor under superatmospheric pressure.

3. In the process for purifying crude coal gases from hydrogen sulfide and hydrogen cyanide, the step which comprises washing the gases with wash liquors containing ammonium polythionate and ammonium thiosulfate and such a quantity of free ammonia as is necessary for the complete removal of hydrogen sulfide and hydrogen cyanide.

4. In the process for purifying crude coal gases from hydrogen sulfide and hydrogen cyanide, the step which comprises washing the gases with wash liquors containing ammonium polythionate and ammonium thiosulfate and such a quantity of free ammonia as is necessary for the complete removal of hydrogen sulfide and hydrogen cyanide under superatmospheric pressure.

In testimony whereof I have hereunto set my hand.

FRITZ OVERDICK. [L. S.]